(12) United States Patent
Pombo et al.

(10) Patent No.: US 11,852,822 B2
(45) Date of Patent: Dec. 26, 2023

(54) CONVERTIBLE WAVEGUIDE OPTICAL ENGINE ASSEMBLY FOR HEAD-MOUNTED DEVICE

(71) Applicant: RealWear, Inc., Vancouver, WA (US)

(72) Inventors: Stephen Pombo, Campbell, CA (US); Christopher Parkinson, Richland, WA (US)

(73) Assignee: RealWear, Inc., Vancouver, WA (US)

( * ) Notice: Subject to any disclaimer, the term of this patent is extended or adjusted under 35 U.S.C. 154(b) by 145 days.

(21) Appl. No.: 17/552,338

(22) Filed: Dec. 15, 2021

(65) Prior Publication Data

US 2023/0010650 A1 Jan. 12, 2023

Related U.S. Application Data

(63) Continuation-in-part of application No. 17/538,712, filed on Nov. 30, 2021.

(Continued)

(51) Int. Cl.
*G02B 27/01* (2006.01)
*G02B 6/00* (2006.01)
(Continued)

(52) U.S. Cl.
CPC ..... *G02B 27/0172* (2013.01); *G02B 27/0176* (2013.01); *G02B 6/00* (2013.01);
(Continued)

(58) Field of Classification Search
CPC .............. G02B 27/017; G02B 27/0172; G02B 27/0176; G02B 27/0101; G02B 27/0972;
(Continued)

(56) References Cited

U.S. PATENT DOCUMENTS 10,108,011 B2 * 10/2018 Nikkhoo ............ G02B 27/0081
10,739,512 B2 * 8/2020 Eisenfeld ........... G02B 27/0018
(Continued)

FOREIGN PATENT DOCUMENTS

CN 112180606 A 1/2021

OTHER PUBLICATIONS

International Search Report and Written Opinion received for PCT Application No. PCT/US2022/028517, dated Aug. 16, 2022, 9 pages.

(Continued)

*Primary Examiner* — Tom V Sheng
(74) *Attorney, Agent, or Firm* — SHOOK, HARDY & BACON L.L.P.

(57) ABSTRACT

A head-mounted computing device having a convertible waveguide optical engine assembly is disclosed. The waveguide in accordance with aspects herein can be utilized in its transparent configuration, or may be provided with means for blocking light from passing through it either by using mechanical means, or by using different types of treatments that can switch the waveguide between opaque an transparent states based on an external stimulus, such as, for example, electricity, temperature, light, and the like. Further, the waveguide optical engine assembly comprises a compact footprint, which is advantageous for head-mounted computing devices. In addition to the compact footprint of the waveguide optical assembly, the configuration of the waveguide optical assembly, as disclosed, allows for maximization of advantages provided by the waveguide as related to eye box and eye relief.

16 Claims, 11 Drawing Sheets

Related U.S. Application Data

(60) Provisional application No. 63/220,237, filed on Jul. 9, 2021.

(51) Int. Cl.
*G02B 6/34* (2006.01)
*G02B 27/09* (2006.01)

(52) U.S. Cl.
CPC ............ *G02B 6/34* (2013.01); *G02B 27/0101* (2013.01); *G02B 27/017* (2013.01); *G02B 27/0972* (2013.01); *G02B 2027/014* (2013.01); *G02B 2027/0118* (2013.01); *G02B 2027/0123* (2013.01); *G02B 2027/0125* (2013.01); *G02B 2027/0178* (2013.01)

(58) Field of Classification Search
CPC ...... G02B 2027/014; G02B 2027/0118; G02B 2027/0123; G02B 2027/0125; G02B 2027/0178; G02B 6/00; G02B 6/34
USPC .................................................. 345/8; 359/13
See application file for complete search history.

(56) References Cited

U.S. PATENT DOCUMENTS

| | | | | |
|---|---|---|---|---|
| 2012/0162549 | A1* | 6/2012 | Gao ..................... | G02B 27/283 359/651 |
| 2012/0200937 | A1* | 8/2012 | Totani ................ | G02B 27/0172 359/631 |
| 2013/0188080 | A1 | 7/2013 | Olsson et al. | |
| 2014/0071539 | A1* | 3/2014 | Gao .................. | G02B 27/0172 359/737 |
| 2015/0253573 | A1 | 9/2015 | Sako et al. | |
| 2016/0217327 | A1 | 7/2016 | Osterhout et al. | |
| 2017/0038579 | A1* | 2/2017 | Yeoh ........................ | G02B 6/10 |
| 2017/0299860 | A1 | 10/2017 | Wall et al. | |
| 2017/0323615 | A1 | 11/2017 | Hazra et al. | |
| 2018/0088325 | A1* | 3/2018 | Brown ................... | G02B 27/30 |
| 2018/0292654 | A1 | 10/2018 | Wall et al. | |
| 2018/0372940 | A1* | 12/2018 | Ishii .................... | G02B 27/0172 |
| 2019/0196205 | A1* | 6/2019 | Pierer ................ | G02B 6/12004 |
| 2019/0196207 | A1* | 6/2019 | Pierer ................ | G02B 27/0172 |
| 2019/0212563 | A1* | 7/2019 | Schultz ............. | G02B 27/0081 |
| 2019/0227317 | A1* | 7/2019 | Trail ...................... | G09G 3/007 |
| 2019/0333480 | A1* | 10/2019 | Lang ........................ | G06F 3/011 |
| 2020/0018968 | A1 | 1/2020 | Edwin et al. | |
| 2020/0111259 | A1 | 4/2020 | Sears et al. | |
| 2020/0192088 | A1* | 6/2020 | Yu ...................... | G02B 27/0081 |
| 2020/0201047 | A1 | 6/2020 | Nakamura et al. | |
| 2020/0310136 | A1* | 10/2020 | Yang ................... | G02B 6/0066 |
| 2020/0348518 | A1* | 11/2020 | Georgiou ........... | G02B 17/0856 |
| 2020/0371357 | A1* | 11/2020 | Choi .................. | G02B 27/0176 |
| 2021/0018752 | A1* | 1/2021 | Sheng ................. | G02B 6/0018 |
| 2021/0033867 | A1* | 2/2021 | Luo ................... | G02B 27/0176 |
| 2021/0072437 | A1* | 3/2021 | Singh ................. | G02B 27/4272 |
| 2021/0103146 | A1 | 4/2021 | Travers et al. | |
| 2021/0149203 | A1 | 5/2021 | Chen et al. | |
| 2021/0149206 | A1 | 5/2021 | Tiffin et al. | |
| 2021/0247608 | A1* | 8/2021 | Eisenfeld .......... | G02B 27/0018 |
| 2022/0128817 | A1* | 4/2022 | Singh ................... | G02B 6/0016 |
| 2022/0299764 | A1* | 9/2022 | Adema ................ | G02B 26/101 |
| 2022/0357499 | A1 | 11/2022 | Danziger et al. | |

OTHER PUBLICATIONS

International Search Report and Written Opinion received for PCT Application No. PCT/US2022/028522, dated Aug. 30, 2022, 10 pages.

Non-Final Office Action dated Jul. 14, 2023 in U.S. Appl. No. 17/538,712, 10 pages.

* cited by examiner

CONVERTIBLE WAVEGUIDE OPTICAL ENGINE ASSEMBLY FOR HEAD-MOUNTED DEVICE

CROSS-REFERENCE TO RELATED APPLICATIONS

This application is a Continuation-in-Part Application of U.S. application Ser. No. 17/538,712, filed on Nov. 30, 2021, entitled "OPAQUE WAVEGUIDE OPTICAL ASSEMBLY FOR HEAD-MOUNTED DEVICE," which in turn claims priority to U.S. Provisional Patent Application No. 63/220,237, filed on Jul. 9, 2021, entitled "HOUSED AND CONVERTIBLE WAVEGUIDE ASSEMBLIES FOR HEAD-MOUNTED DISPLAY." The entireties of the aforementioned applications are assigned or under obligation of assignment to the same entity as this application, and the entire contents of each application is being herein incorporated by reference.

BACKGROUND

A head-mounted computing device, also generally known as a head-mounted display or "HMD," enables users to mount a mobile computing device on or around their head, facilitating the transport and utilization of advanced computing technologies with greater ease and flexibility. HMDs also enable a user to have interaction with the technology while otherwise remaining engaged in other tasks. For instance, HMDs can be voice activated and hands-free, so that users can focus on other more "physical" tasks, or simply when they desire a more hands-free computing experience.

The displays for HMDs are conventionally microdisplays such as, for example, liquid crystal display (LCD), liquid crystal on silicon (LCOS), organic light emitting diodes (OLED), dot matrix display (DMD), and the like, coupled with refractive optics. This combination produces an HMD that may have a smaller-than-desired eye relief, eye box, and field of view.

SUMMARY

Embodiments of the present invention relate to a HMD that overcomes the limitations of previous HMDs by providing a HMD with a waveguide optical engine assembly including a microprojector (such as a digital micromirror device DMD projector) paired with a waveguide such as the waveguides available from WaveOptics®. Waveguides, which are generally clear or transparent (i.e. see through; allowing light to pass through so that objects behind can be distinctly seen or visually perceived), have superior eye relief, eye box and fields of view when compared to conventional optics, which allows them to be used in virtual reality applications that allows a user to view images through (i.e. projected onto) the waveguide to appear as if they are part of the real world environment(s), also known as augmented reality (AR).

The waveguide optical engine assembly for the HMD in accordance with aspects herein, in addition to having a microprojector coupled to a waveguide, it also includes a prism for projecting a source image projected by the microprojector to the waveguide. The microprojector, the waveguide and the prism of the waveguide optical engine assembly can all be enclosed within an opaque housing. As used herein, opaque means not transparent or translucent, which prevents light from passing through its body. This enclosed configuration allows for reduction of volume and improved energy efficiency by preventing environmental light from interfering with an image projected onto the waveguide. In other words, the energy requirements of the waveguide are greatly reduced because the brightness of the waveguide does not have be adjusted to compensate for environmental lighting so that image quality is not sacrificed. Further, the enclosed configuration of the waveguide optical engine assembly affords the HMD disclosed herein to have improved field of view, eye relief distance, and eye box.

Alternatively, the waveguide optical engine assembly can be set up to be convertible between an opaque mode (i.e., not letting light pass through its body, not transparent or translucent) and a clear or transparent mode (i.e. see through; allowing light to pass through so that objects behind can be distinctly seen or visually perceived), thereby fully taking advantage of the properties of the waveguide, as described above. For example, if the waveguide optical engine assembly is being utilized in an adequately lighted environment, an opaque mode of the waveguide optical engine assembly may be preferable, for the reasons described above. However, if the waveguide optical engine assembly is being used in a dark or darkened environment, the transparent mode of the waveguide optical engine assembly may be preferable, or the transparent mode of the waveguide optical engine assembly may be preferable if the HMD is being used in an AR setting. This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
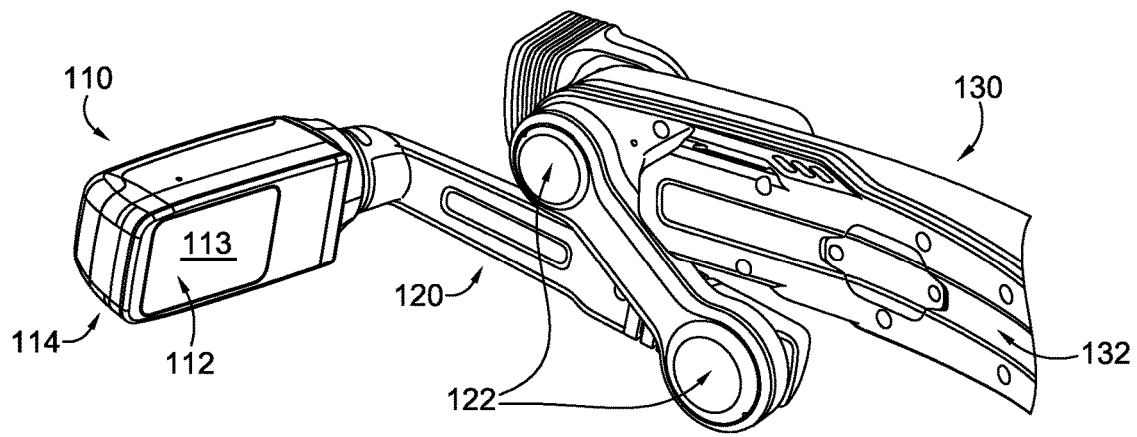
FIG. 1 is an illustration of a waveguide optical engine assembly coupled to a boom arm of a head-mounted computing device in accordance with aspects disclosed herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, head-mounted computing devices (also referenced herein as "HMDs") allow users to mount mobile computing devices on or around their head, enabling the user to transport and utilize advanced technologies with greater ease and flexibility, and allowing a user to have interaction with the technology while otherwise remaining engaged in other tasks. The microdisplays for conventional HMDs can traditionally include LCD, LCOS, OLED, DMD, and the like. Traditional microdisplay technologies, however, often require a relatively large footprint that is not desirable for head-mounted applications. In addition, the conventional microdisplay technologies can have a limited eye box and eye relief, which requires the HMD to be in a fixed position relative to a wearer's sightlines in order for the user to view a clear image. Additionally, other disadvantages of the conventional microdisplay technologies can include rapid battery drain, particularly with continuous or constant utilization.

On the other hand, some HMDs, such as those typically utilized in AR applications, utilize waveguides that generally have transparent, light weight bodies, and are generally known to utilize less energy than conventional microdisplay technologies, have larger fields of view, more extensive eye relief, and provide larger eye boxes for users/viewers. Also, waveguides generally have a smaller footprint (e.g., are thinner, lighter) than conventional microdisplays, which makes them ideal for HMD applications.

Aspects disclosed herein allow waveguides traditionally used in only AR applications to be used in non-AR environments. This can be achieved by enclosing the waveguide into a housing made of opaque materials so that an opaque background is provided for the waveguide, thereby essentially making the waveguide opaque or non-transparent. Other configurations may include, for example, providing a convertible waveguide optical engine assembly that can be transitioned from an opaque mode to a clear or transparent mode based on environmental lighting or the desired application of the waveguide optical engine assembly.

The different configurations disclosed herein of the waveguide optical engine assembly reduces the footprint of the waveguide optical engine assembly. Particularly, in the enclosed configuration where the waveguide is enclosed within a housing, the microprojector and prism can be overlapped with the waveguide (placed behind the waveguide), where the housing may be configured to substantially enclose the waveguide optical engine assembly. In other words, at least 80%, 85%, 90%, 95%, or 100% of a rear side of the waveguide optical engine assembly is enclosed such that limited to no environmental light can pass through the rear side of the waveguide. In a convertible waveguide optical engine assembly, the microprojector and prism may be substantially enclosed within a housing to form a projection source, while the waveguide is secured to a base. Then, the projection source may be equipped with sensors to transition between opaque and transparent modes by either aligning the projection source with the waveguide so that the projection source essentially serves as a background for the waveguide, or misaligning the projection source with respect to the waveguide, leaving the waveguide unobstructed (i.e., not blocked, transparent). Alternatively the waveguide may be coupled to a smart glass technology such as a photochromic (light sensitive), thermochromic (temperature sensitive), electrochromic (electricity/voltage sensitive) smart glass technology, and the like, to change the light transmission properties of the waveguide in response to a respective stimulus, as will become clearer with respect to the figures.

In accordance with embodiments described herein, environmental light can include any light source that is not generated by a light projecting device coupled to the waveguide. In this regard, the opaque housing or prevents the passage of environmental light through the rear portion of the waveguide. To this end, when the housed, covered, or otherwise made opaque waveguide is utilized to display an output provided for display from, for example, the microprojector, or from a processing device coupled thereto when there is competing environmental lighting present, the waveguide in accordance with the disclosed embodiments provides clear images with optimized eye box, requires less power and thus extends HMD battery life because the amount of light required to illuminate and view the covered, housed, or otherwise opaque waveguide is significantly less than is typically required in conventional waveguide applications, i.e., transparent waveguide applications. In other words, the waveguide optical engine assembly having the housed, covered, or otherwise made opaque waveguide retains all the known benefits of waveguides such as larger field of view, eye relief distance, and eye box, while reducing its power requirements when there is interfering environmental light present.

Figure 2:
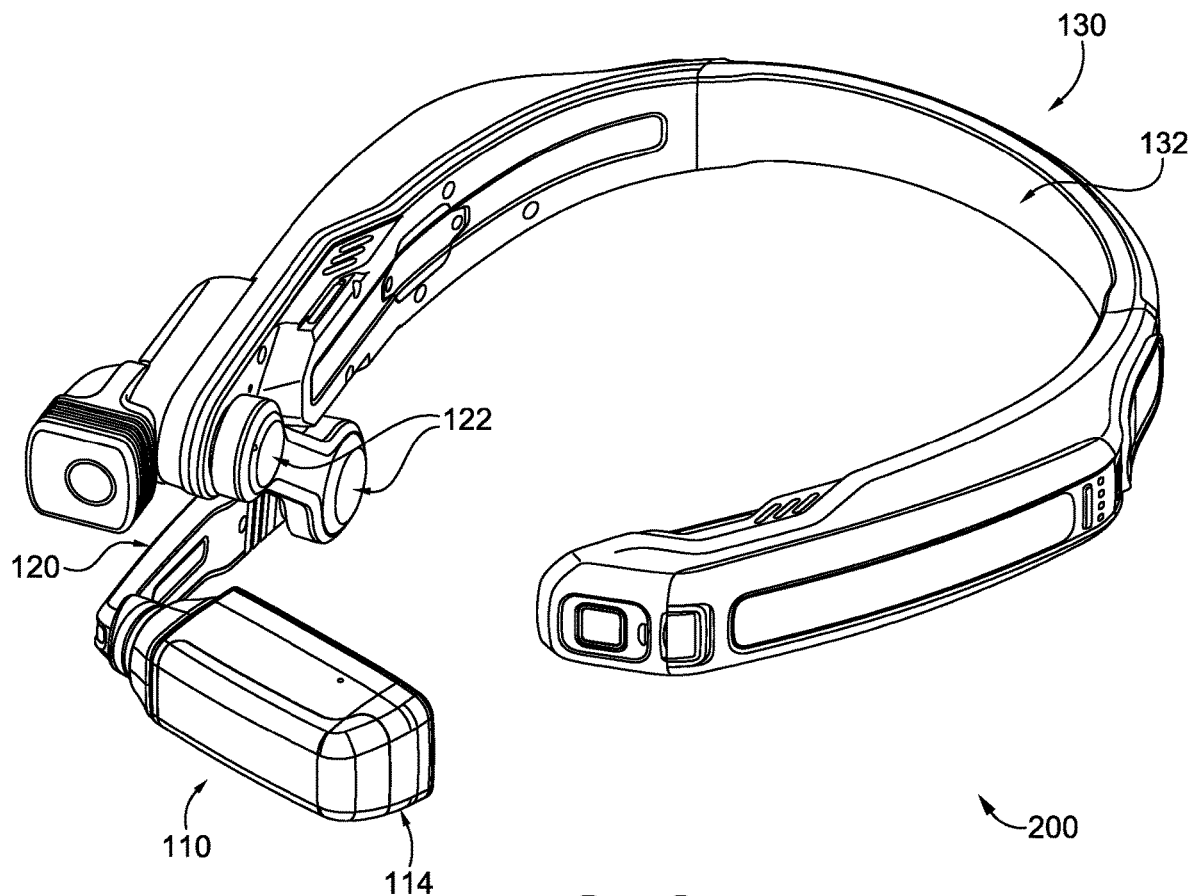
FIG. 2 is an illustration of a head-mounted computing device having a waveguide optical engine in accordance with aspects disclosed herein.

Various embodiments of a head-mounted computing device 130 are depicted in FIGS. 1-14B, provided herein. Specifically, FIG. 1 depicts a right perspective view 100 of a right-side portion of a waveguide optical engine assembly 110. By way of non-limiting example, the HMT-1 from RealWear, Inc. headquartered in Vancouver, Wash., is a head-mounted computing device that can be referenced and implemented in accordance with some embodiments of the present disclosure. FIG. 2 depicts a front perspective view 200 of the head-mounted computing device 130 in accordance with some of the described embodiments. With reference to both FIGS. 1 and 2, the head-mounted computing device 130 can include a waveguide optical engine assembly 110 and a boom arm 120, whereby the waveguide optical engine assembly 110 can be mounted to the head-mounted computing device 130. As shown in FIG. 1, the user facing portion of the waveguide optical engine assembly 110, comprises a display surface 113 that exposes a portion of the waveguide 112. The boom arm 120, as shown, comprises articulating joints 122 that allows the user to adjust a position of the waveguide optical engine assembly 110 with respect to a sightline of the user when the head-mounted computing device 130 is mounted on the user's head or the user's head gear. However, the boom arm 120 is only exemplary and it is also contemplated that the boom arm my only have one articulating joint, or have more than two articulating joints, or have no articulating joints, without departing from aspects disclosed herein. The head-mounted computing device can be mounted and secured onto the user's head or onto the user's head gear through a resilient support 132. Different types of headwear can include, among other things, a baseball hat, helmet, a bump cap, a visor, a stocking cap, an elastic band or tri-band, or any other form-factor of headwear that can be worn on the head of a user.

In accordance with aspects herein, a waveguide optical engine assembly 110 can be fixedly and/or movably attached to, a head-mounted computing device 130. The head-mounted computing device 130 can include, by way of non-limiting example, any headwear that is adapted to receive the head-mounted computing device 130 having the waveguide optical engine assembly 110. In some embodiments, the resilient support 132 can include an arcuate band made of plastic or rigid yet flexible materials shaped to span from one side of a user's head, over a top of the user's head, and/or to another side of the user's head. In another example embodiment, the resilient support 132 can extend around a circumference of the user's head, extending around the forehead, around one side, around a back side, and/or around a second side of the user's head.

Furthermore, the boom arm 120 of the head-mounted computing device 130 can selectively or fixedly extend the waveguide optical engine assembly 110 forward of a user (i.e., a wearer of head-mounted computing device 130) to align the waveguide optical engine assembly 110 in front of one or more of the user's eyes via the articulating joints 122. The articulating joints 122 for pivoting, extending, or otherwise adjusting a location of the waveguide optical engine assembly 110 relative to a user, and in particular, at least one eye of the user in various as-worn configurations. In some embodiments, as described herein, the boom arm 120 can be integrally formed with a housing 114 that encloses the waveguide optical engine assembly 110 and various other electronic components of the head-mounted computing device 130.

Figure 3:
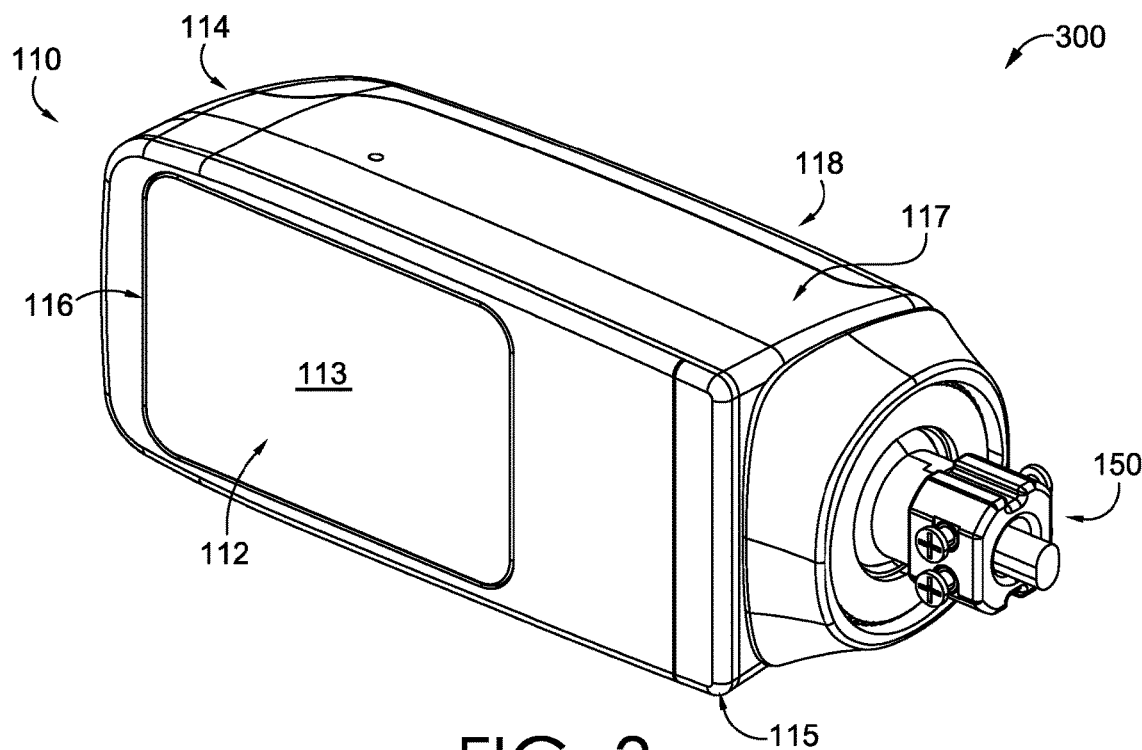
FIG. 3 is a front view of a waveguide optical engine assembly in accordance with aspects disclosed herein.

Continuing onto FIG. 3, FIG. 3 depicts a front perspective view 300, or in other words a "display-side view," of a waveguide optical engine assembly 110 enclosed within housing 114 in accordance with embodiments of the present invention. At a high level, the housing 114 enclosing the waveguide optical engine assembly 110 has a generally rectangular cuboid shape (as shown), though other shapes for either the housing 114 or display surface 113 are contemplated as being within the scope of the present disclosure. The housing 114 can include a face plate 115 (i.e., user-facing) that partially covers a front side of the waveguide 112, exposing a front side of the waveguide 112 through a void 116, thereby forming the display surface 113 of the waveguide 112.

Figure 4:
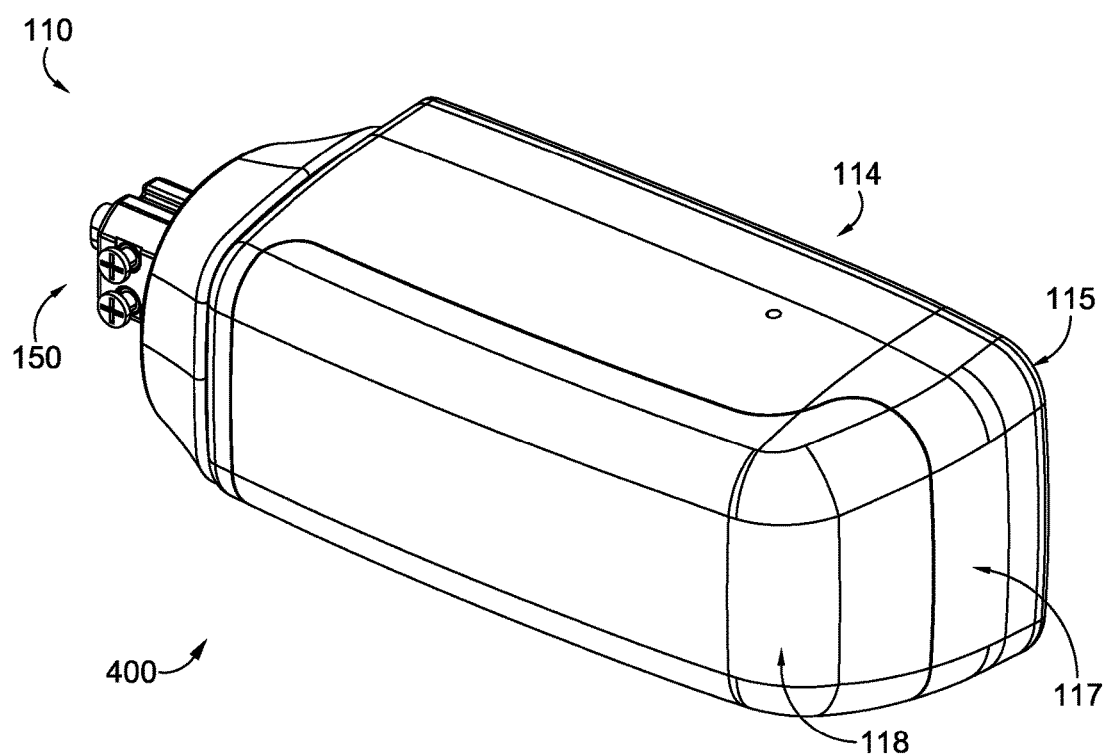
FIG. 4 is a rear view of a waveguide optical engine assembly in accordance with aspects disclosed herein.

Continuing on with the figures, FIG. 4 depicts a rear perspective view 400, or in other words a rear or "backside" view, of the waveguide optical engine assembly 110 shown in FIG. 3, as enclosed within the housing 114. As shown in FIG. 4, the housing 114 can further include the mid-section 117 and an opaque back-plate 118 for completely enclosing the remaining components of the waveguide optical engine assembly 110 such as, for example, a microprojector, a prism, and the like. As further shown in FIGS. 3 and 4, the waveguide optical engine assembly 110 connects to the boom arm 120 of the head-mounted computing device 130 through a connection assembly 150.

Figure 5:
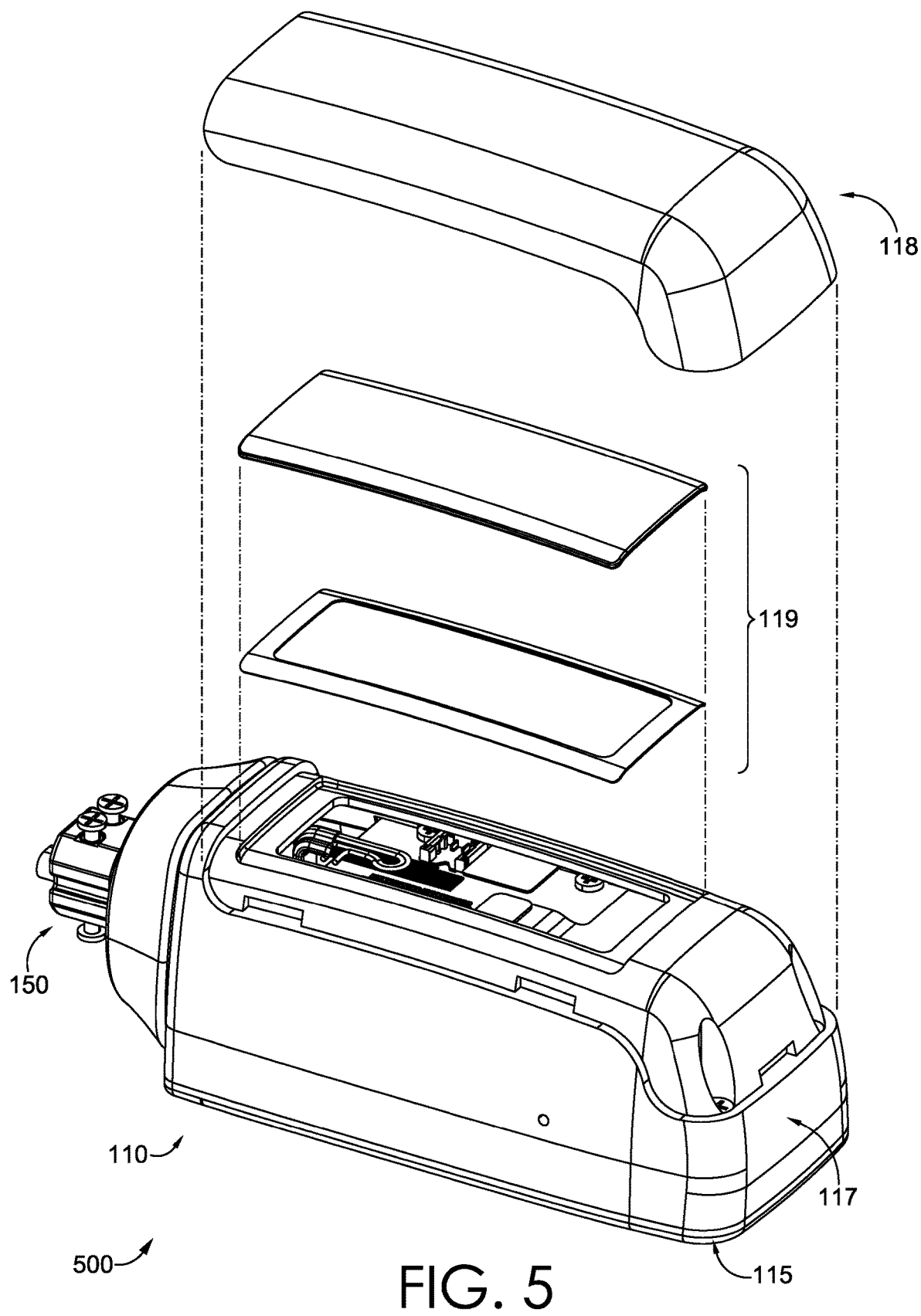
FIG. 5 is an exploded bottom perspective view of a waveguide optical engine assembly having a back-plate in accordance with aspects disclosed herein.

Continuing onto FIG. 5, FIG. 5 depicts an exploded perspective view 500 of the waveguide optical engine assembly 110. As shown, the backside of the waveguide optical engine assembly 110 is provided with an opaque back-plate 118. In accordance with the illustrated embodiment, the opaque back-plate 118 can be removably attached to the waveguide optical engine assembly 110. Further, in some embodiments, the waveguide optical engine assembly 110 can further include additional back-plates 119, such as, for example, covers, gaskets, and the like, which can facilitate the enclosure of various internal components of the waveguide optical engine assembly 110 (e.g., microprojector, prism, waveguide, frame, circuitry, and the like).

Figure 6:
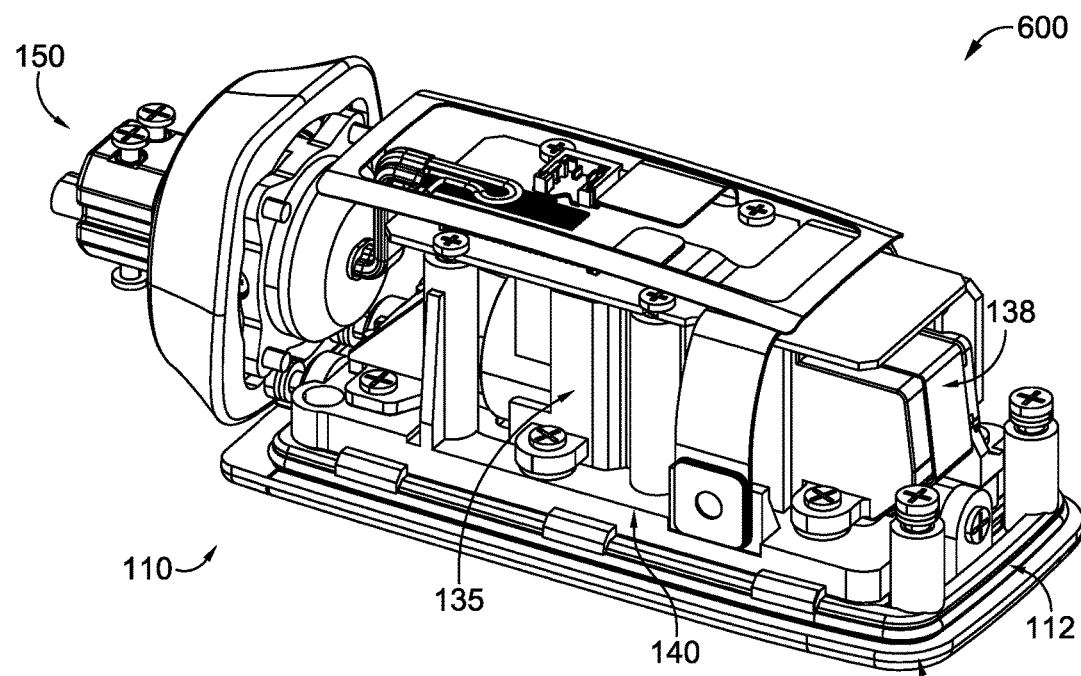
FIG. 6 is perspective view of a waveguide optical engine assembly having a housing mid-section and back-plate removed therefrom in accordance with aspects disclosed herein.
Figure 7:
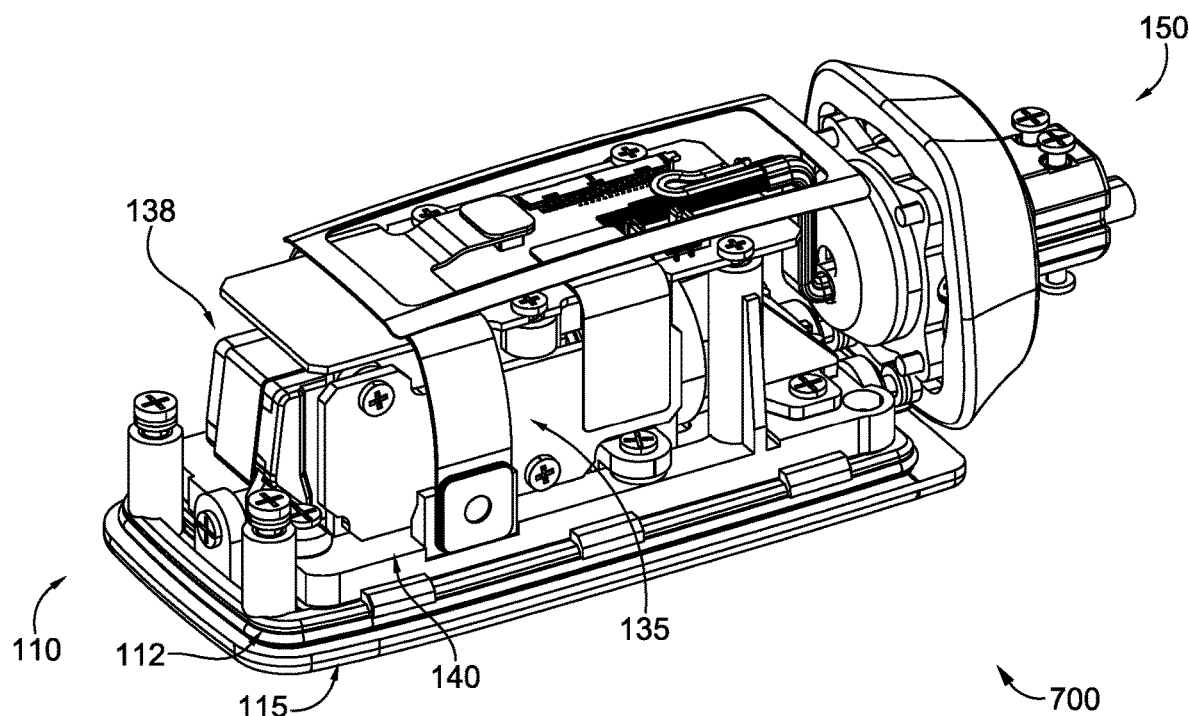
FIG. 7 is another perspective view of a waveguide optical engine assembly having a housing mid-section and back-plate removed therefrom in accordance with aspects disclosed herein.

FIG. 6 depicts a perspective view 600 of the waveguide optical engine assembly 110 having the mid-section 117 and the opaque back-plate 118 of the housing 114 removed therefrom, thereby exposing various internal components of the waveguide optical engine assembly 110. FIG. 7 depicts an opposite perspective view 700 of the waveguide optical engine assembly 110, also having the mid-section 117 and opaque back-plate 118 of the housing 114 removed.

FIGS. 6 and 7, the internal components of the waveguide optical engine assembly 110 can include, among other things, a waveguide 112, a microprojector 135, a prism assembly 139, an assembly frame 140, a power source (not shown), and the like, where the microprojector 135 and the waveguide 112 are essentially coupled to each other by the prism assembly 139, as will be further described in more detail below. In the depicted embodiment, the assembly frame 140 is configured to receive and secure the various internal components of the waveguide optical engine assembly 110 relative to one another, as more clearly seen in the exploded view 800 shown in FIG. 8.

Figure 8:
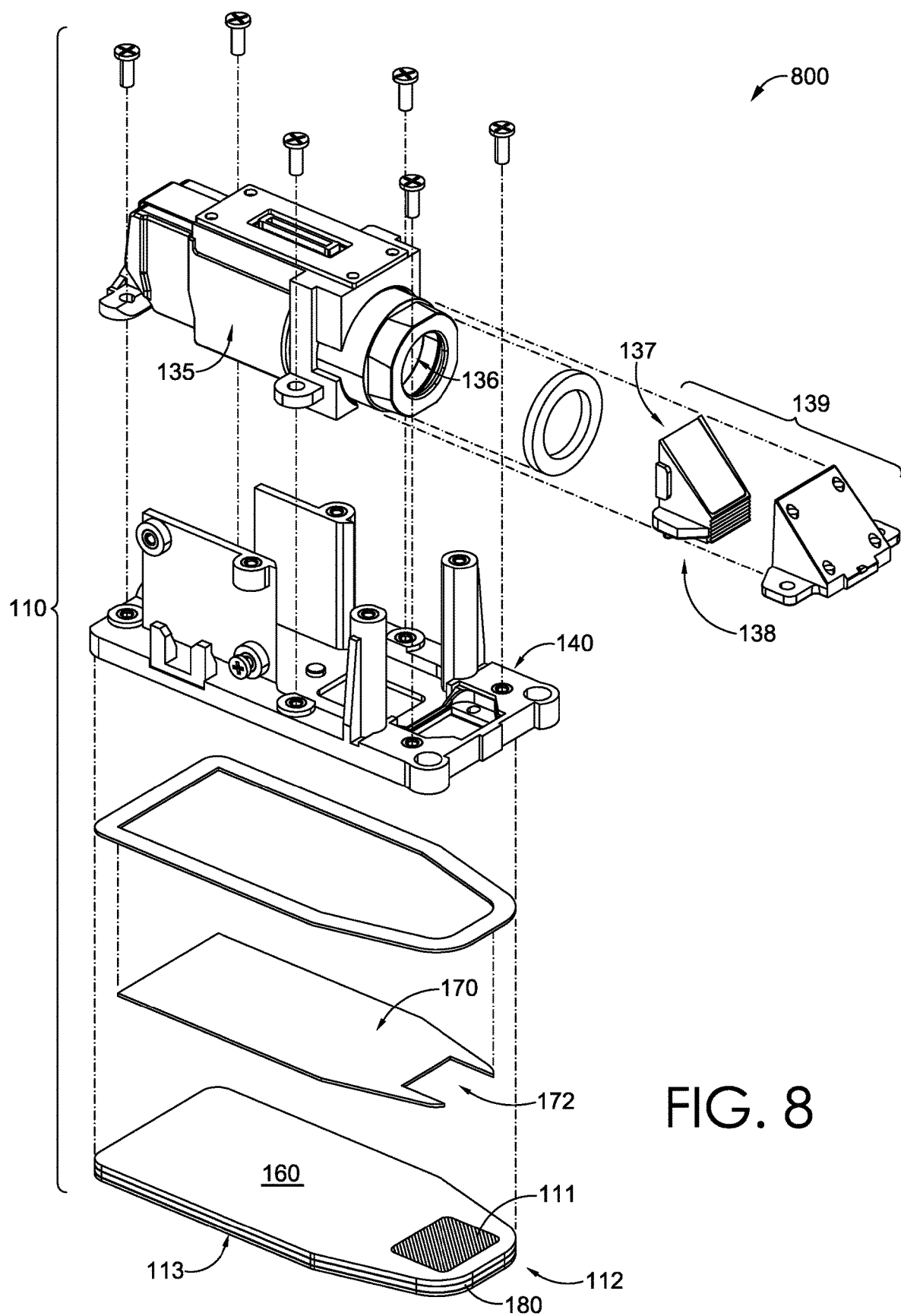
FIG. 8 is an exploded perspective view of a waveguide optical engine assembly having a housing removed therefrom in accordance with aspects disclosed herein.

As shown in FIG. 8, the waveguide 112 by way of a non-limiting example, can be transparent having a display surface 113 and an opposite rear surface 160. The rear surface 160 of the waveguide 112 is equipped with an input portion 111, where the display surface 113 and the rear surface 160 are separated by a side or edge portion 180. The microprojector 135 is configured to project light and a source image (not shown) onto an input end 137 of the prism assembly 139. Then, an output end 138 of the prism assembly 139 is configured to reflect the light and the source image coming from the microprojector 135 onto the input portion 111 of the waveguide 112 so that the source image and light are amplified in the waveguide 112. As a result, a user is able to view the amplified source image with an optimal amount of brightness through the display surface 113 of the waveguide 112. An advantage of the waveguide optical engine assembly 110 is that image clarity of the source image is not deteriorated even when a position (i.e. distance from the eyes of the user and/or position with respect to a vertical axis running parallel to the user's height as measured from the user's head to the user's feet) of the waveguide optical engine assembly 110 is moved or changed with respect to the sightline of a user of the head-mounted computing device 130. This is because the waveguide 112 allows the waveguide optical engine assembly 110 to have a larger eye box and a wider range of eye relief when compared to conventional microdisplay technologies such as, for example, LCD, LCOS, OLED, DMD, and the like.

Further, in accordance with some aspects herein, the waveguide 112 of the waveguide optical engine assembly 110 may be made opaque by providing an opaque housing. Additionally, the waveguide 112 may be made opaque by further providing a light shield 170 to cover the rear surface 160 of the waveguide 112. The light shield 170 being configured to be opaque such that it is able to prevent light from passing through the waveguide. In some instances where the light shield 170 is provided, it is contemplated that the housing may optionally be made at least partially transparent, allowing a user to view internal components of the waveguide optical engine assembly 110 without sacrificing shielding of the rear surface 160 of the waveguide 112 from environmental light. As shown, the light shield comprises a notch 172 configured to allow exposure of the input portion 111 of the waveguide 112 to the output end 138 of the prism assembly 139. As provided above, making the waveguide 112 opaque allows for the waveguide 112 to amplify and display the source image to the user without having to compensate for ambient light, which is in turn also reduces energy requirements of the waveguide optical engine assembly 110. To this end, in further aspects, the waveguide optical engine assembly 110 may further comprise a brightness controller equipped with one or more sensors (not shown). The one or more sensors of the brightness controller may be configured to detect levels of ambient light, and the brightness controller may be adapted to reduce a brightness level of the projected light and source image coming from the microprojector 135 based on the levels of ambient light that the waveguide 112 is exposed to, which is greatly reduced or minimized in the waveguide optical engine assembly 110, as disclosed herein.

Figure 9:
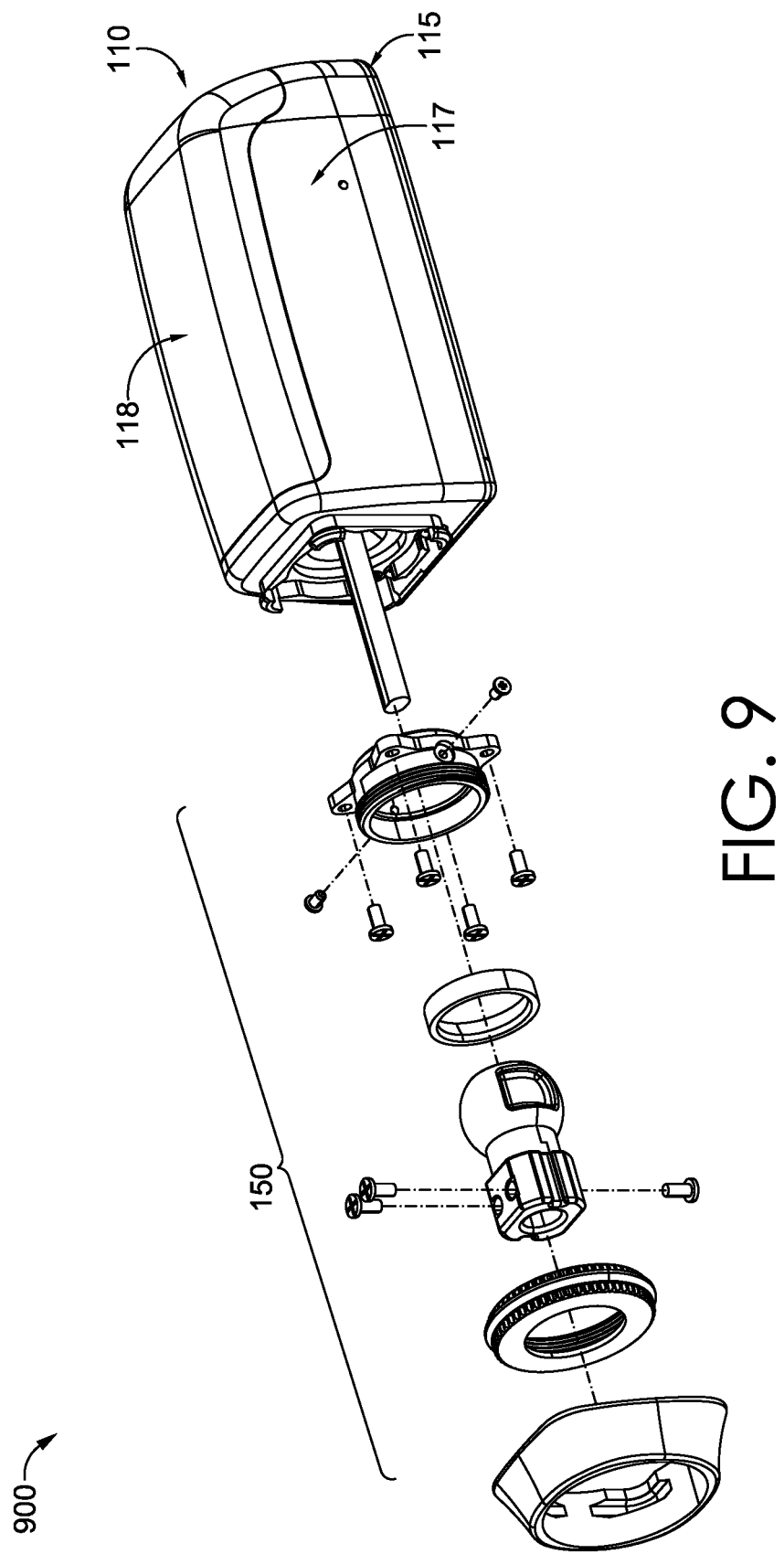
FIG. 9 is an exploded perspective view of a coupling assembly for coupling a waveguide optical engine assembly and a boom arm in accordance with aspects disclosed herein.

In accordance with aspects herein, and as will be described in more detail in relation to FIG. 9, the waveguide optical engine assembly 110 can further include a ball joint or other type of connection assembly 150, which is configured to movably attach the waveguide optical engine assembly 110 to head-mounted computing devices such as head-mounted computing device 130. The connection assembly 150 can rotatably or pivotally attach the waveguide optical engine assembly 110 to head-mounted computing devices, such as boom arm 120 of head-mounted computing device 130, for adjustment of a location of the waveguide optical engine assembly 110 with respect to a face of a wearer of the head-mounted computing device 130. Additionally or alternatively, the connection assembly 150 can be fixedly couple the waveguide optical engine assembly 110 to head-mounted computing devices, such as the head-mounted computing device 130 of FIGS. 1-8. Specifically, FIG. 9 depicts an exploded perspective view 900 of the connection assembly 150 (e.g., ball joint) that rotatably or pivotally couples the waveguide optical engine assembly 110 to the boom arm 120 of the head-mounted computing device 130 for providing the ability to adjust a position of the waveguide optical engine assembly 110 with respect to a field of view of the wearer.

Figure 10:
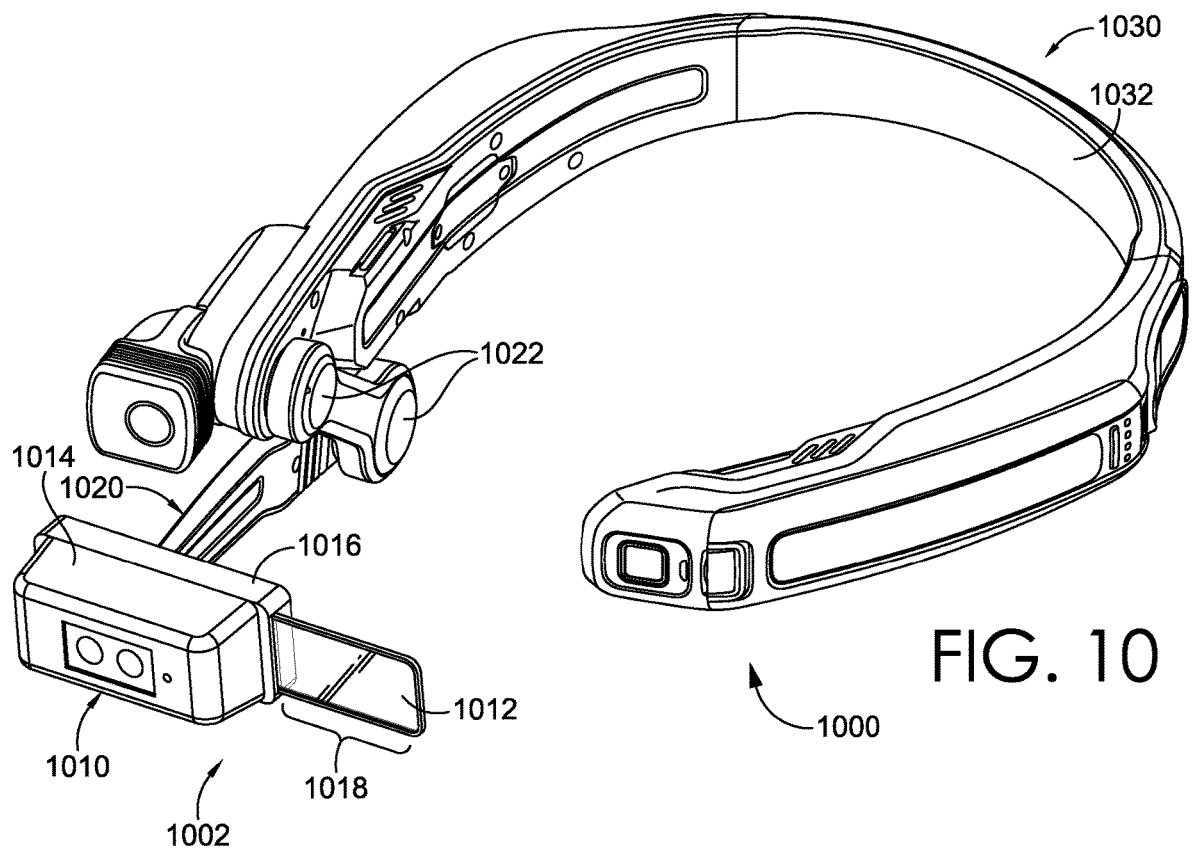
FIG. 10 is an illustration of a first configuration of a head-mounted computing device having a convertible waveguide optical engine assembly coupled to a boom arm of the head-mounted computing device in accordance with aspects disclosed herein.

FIG. 10 depicts a front perspective view 1000 of a head-mounted computing device 1030 in accordance with some of the described embodiments. The head-mounted computing device 1030 can include a waveguide optical engine assembly 1010, a boom arm 1020, whereby the waveguide optical engine assembly 1010 can be mounted to the head-mounted computing device 130, and a resilient support 1032 for mounting the head-mounted computing device 1030 on a head gear or head of a user. As shown in FIG. 10, the user facing portion of the waveguide optical engine assembly 1010, comprises a waveguide 1012 and a projection assembly 1014, both of which are secured to a base 1016. The boom arm 1020, as shown, comprises articulating joints 1022 that allows the user to adjust a position of the waveguide optical engine assembly 1010 with respect to a sightline of the user when the head-mounted computing device 1030 is mounted on the user's head or the user's head gear. As provided above, the boom arm 1020 is only exemplary and it is also contemplated that the boom arm my only have one articulating joint, or have more than two articulating joints, or have no articulating joints, without departing from aspects disclosed herein. The head-mounted computing device 1030 can be mounted and secured directly onto the user's head or onto the user's head gear through the resilient support 1032.

In accordance with aspects herein, a waveguide optical engine assembly 1010 can be fixedly and/or movably attached to, the head-mounted computing device 1030. The head-mounted computing device 1030 can include, by way of non-limiting example, any headwear that is adapted to receive the head-mounted computing device 1030 having the waveguide optical engine assembly 1010. In some embodiments, the resilient support 1032 can include an arcuate band made of plastic or rigid yet flexible materials shaped to span from one side of a user's head, over a top of the user's head, and/or to another side of the user's head. In another example embodiment, the resilient support 1032 can extend around a circumference of the user's head, extending around the forehead, around one side, around a back side, and/or around a second side of the user's head.

Furthermore, the boom arm 1020 of the head-mounted computing device 1030 can selectively or fixedly extend the waveguide optical engine assembly 1010 forward of a user (i.e., a wearer of head-mounted computing device 1030) to align the waveguide optical engine assembly 1010 in front of one or more of the user's eyes via the articulating joints 1022. The articulating joints 1022 may function accordingly for pivoting, extending, or otherwise adjusting a location of the waveguide optical engine assembly 1010 relative to a user, and in particular, at least one eye of the user in various as-worn configurations. In some embodiments, as described herein, the boom arm 1020 can be integrally formed with a base 1016 to which the projection assembly 1014 and the waveguide 1012 are secured. Other various electronic components of the head-mounted computing device 1030 may either be housed in the base 1016 or the projection assembly 1014, or distributed in both, as suitable.

In FIG. 10, the waveguide optical engine assembly 1010 is depicted as being in an unobstructed configuration, where the projection assembly 1014 and the waveguide 1012 are offset, not overlapping, or misaligned so that a display portion 1018 of the waveguide 1012 is unobstructed. In this unobstructed configuration 1002, the waveguide 1012 is fully transparent. As discussed with respect to FIG. 8, the waveguide 1012 comprises an input portion (shown in FIGS. 12A-12D as 1211) that is housed within the base 1016. The input portion and the projection assembly 1014 are configured to overlap such that a source image can be transferred to the input portion and projected onto the display portion 1018 of the waveguide 1012. As noted above, the unobstructed configuration 1002 of the waveguide optical engine assembly 1010 may be desirable when environmental light is limited, or in AR type of applications.

Figure 11:
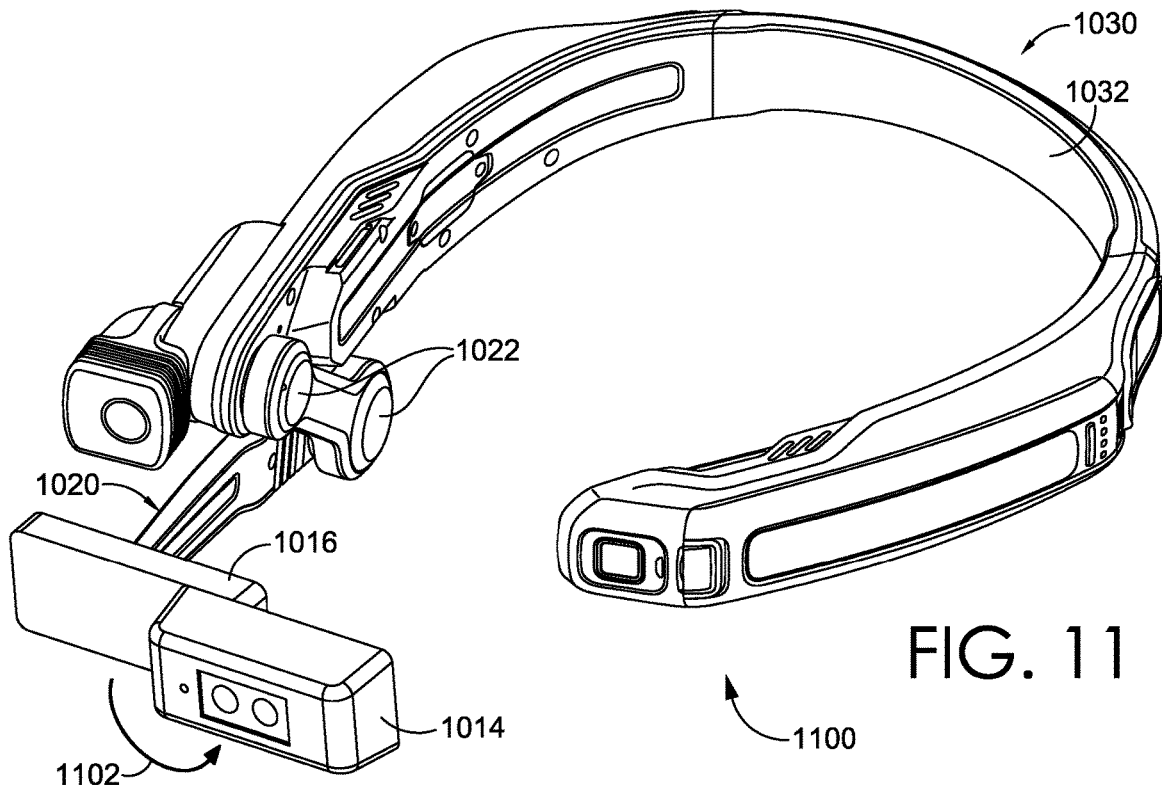
FIG. 11 is an illustration of a second configuration of a head-mounted computing device having a convertible waveguide optical engine assembly coupled to a boom arm of the head-mounted computing device in accordance with aspects disclosed herein.

FIG. 11 depicts a front perspective view 1100 of the waveguide optical engine assembly 1010 in an obstructed configuration 1102 (i.e., blocked, not transparent), where the projection assembly 1014 is moved with respect to the waveguide 1012 so that a back surface (shown as 1230 in FIGS. 12B-12D) can serve as a background for the display portion 1018 of the waveguide 1012. Thus, the projection assembly 1014 can function as a light shield so that interference from environmental lighting can be diminished, as in the waveguide optical engine assembly 110, discussed above. As such, in the obstructed configuration 1102, the waveguide optical engine assembly 1010 would function similar to the waveguide optical engine assembly 110.

Figure 12A:
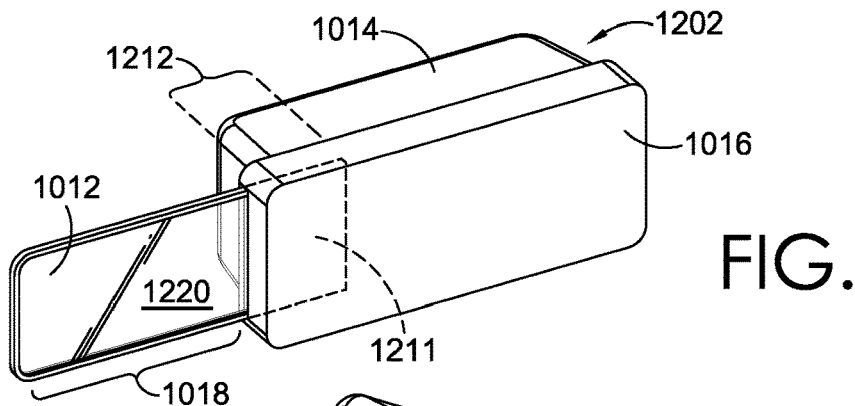
FIGS. 12A-12D are an illustration of conversion steps for the conversion of a convertible waveguide optical engine assembly in accordance with aspects disclosed herein.
Figure 12B:
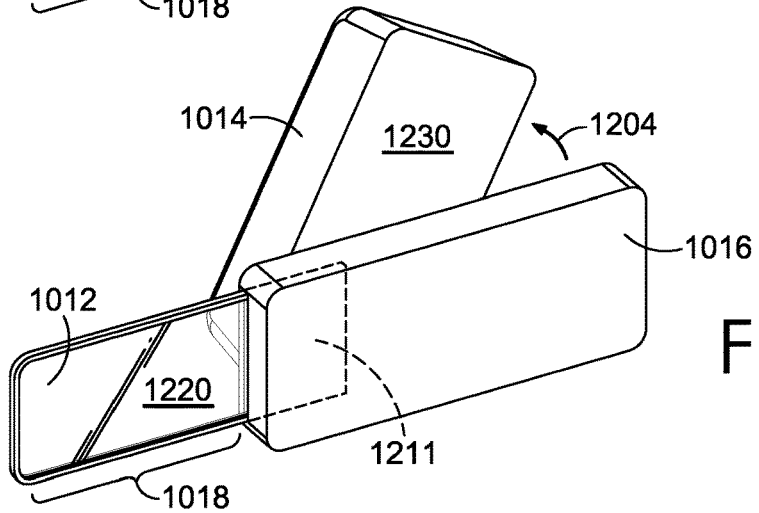

It is contemplated that the waveguide optical engine assembly 1010 can be transitioned back and forth from the obstructed configuration 1102 and the unobstructed configuration 1202 in any suitable manner such as, for example, by a side to side sliding action (not shown), or a rotational action, as shown in FIGS. 12A-12B. FIG. 12A, depicts the waveguide optical engine assembly 1010 in the unobstructed configuration 1202, as discussed above, with respect to FIG. 10. As shown, the input portion 1211 of the waveguide 1012 is housed within the base 1016. Further, as shown the input portion 1211 is aligned with a portion 1212 of the projection assembly 1014. For example, this alignment may allow the input portion 1211 of the waveguide 1012 to align with an output portion of, for example, a prism assembly (such as prism assembly 139) that is configured to transfer a source image for projection onto the display surface 1220 of the display portion 1018 of the waveguide 1012.

Figure 12C:
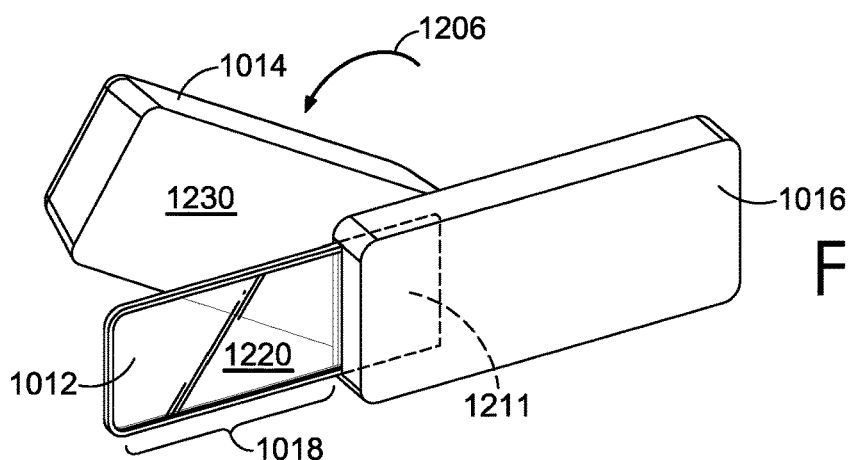
Figure 12D:
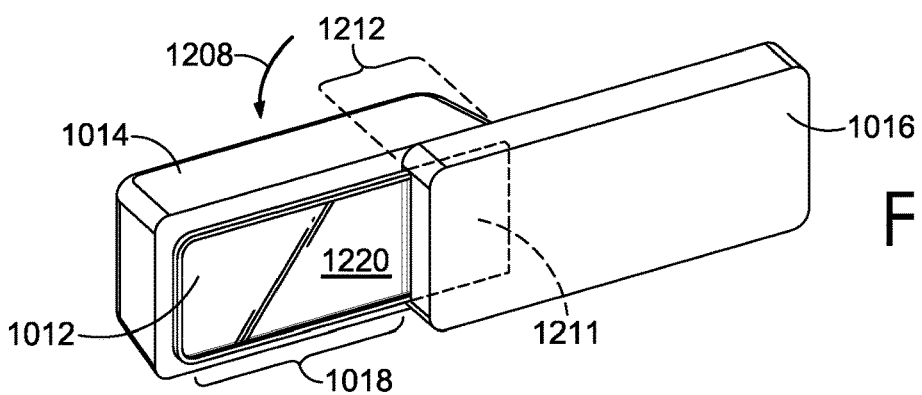

When the obstructed configuration 1208 (shown in FIG. 12D) is desired, the projection assembly 1014 may be moved as shown in intermediate step 1204 shown in FIG. 12B and intermediate step 1206, as shown in FIG. 12C, so that a back surface 1230 of the projection assembly 1014 can be used as a background for the waveguide 1012. Because of the rotation of the projection assembly 1014, the waveguide optical engine assembly 1010 may be further equipped with a motion sensor, a gyroscope, or any other suitable means for detecting a position of the projection assembly 1014 so that any image projected onto the display surface 1220 of the display portion 1018 of the waveguide 1012, can be appropriately turned with respect to the orientation of the projection assembly 1014. This would allow a user to always access the image projected onto the display surface 1220 of the display portion 1018 of the waveguide 1012 in a correct orientation (i.e., right side up orientation). As shown in FIG. 12D, the back surface 1230 is configured to fully cover the display portion 1018 of the waveguide 1012 to provide the obstructed configuration 1208, which makes the waveguide 1012 fully opaque. As shown in FIGS. 12A-12B the pivoting point of the projection assembly 1014 can coincide with the portion 1212 of the projection assembly 1014, which also aligns with the input portion 1211 of the waveguide 1012. This configuration may allow for a reduced footprint for the waveguide optical engine assembly 1010.

Figure 13A:
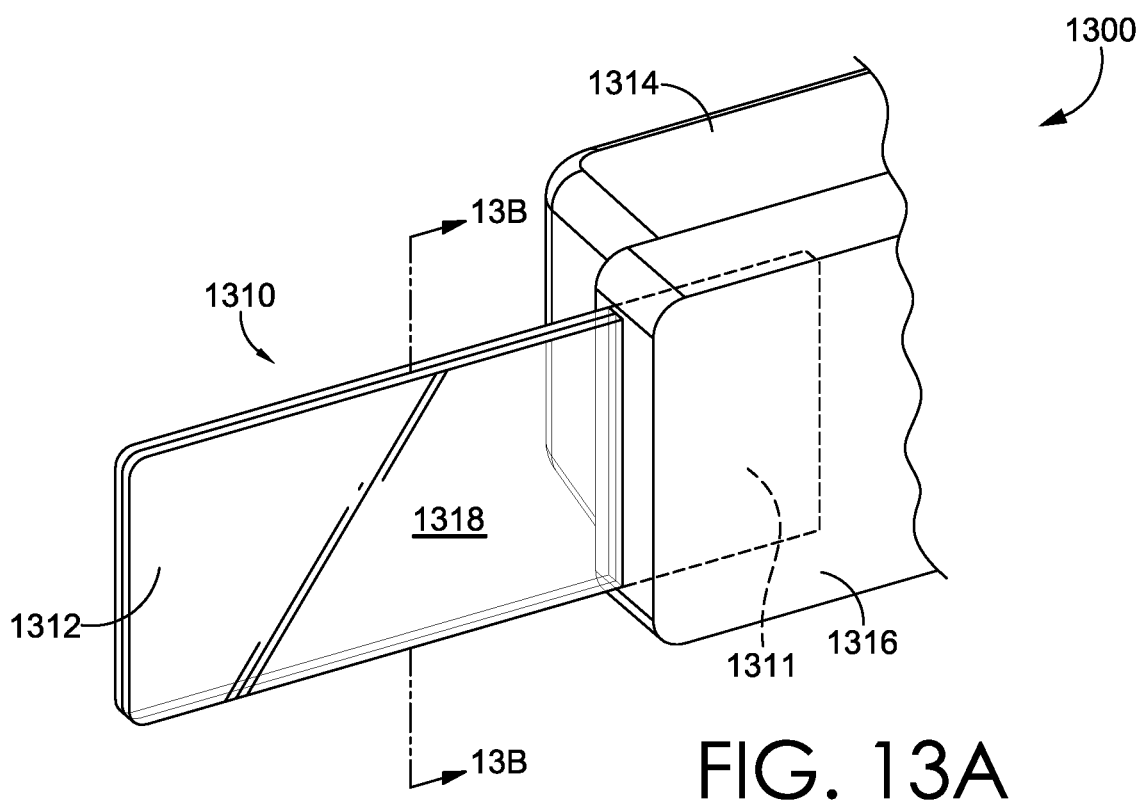
FIG. 13A is a close up view of a portion of a convertible waveguide optical engine assembly in a first configuration, in accordance with aspects disclosed herein.
Figure 13B:
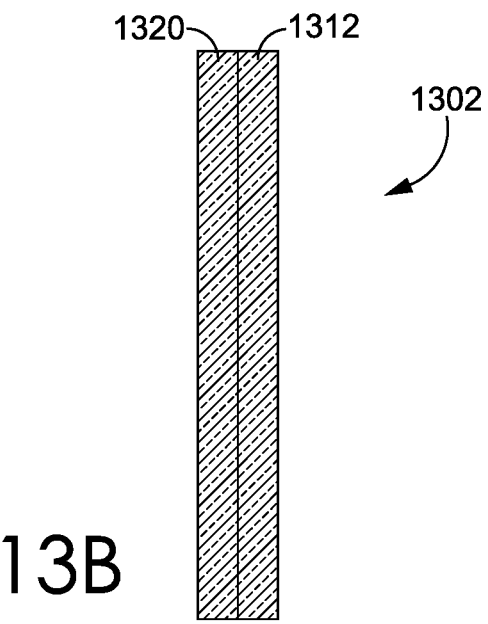
FIG. 13B is a cross-sectional view of the convertible waveguide optical engine assembly shown in FIG. 13A taken at line 13B-13B in accordance with aspects disclosed herein.
Figure 14A:
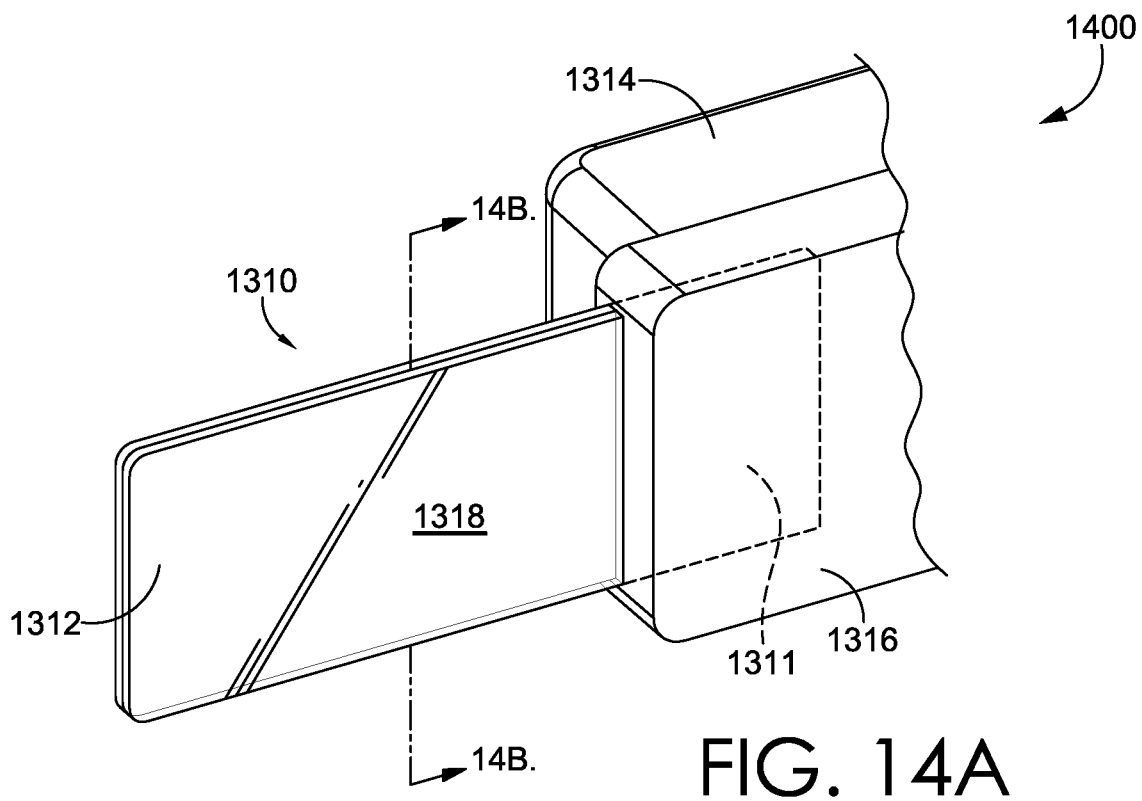
FIG. 14A is a close up view of a portion of a convertible waveguide optical engine assembly in a second configuration, in accordance with aspects disclosed herein.
Figure 14B:
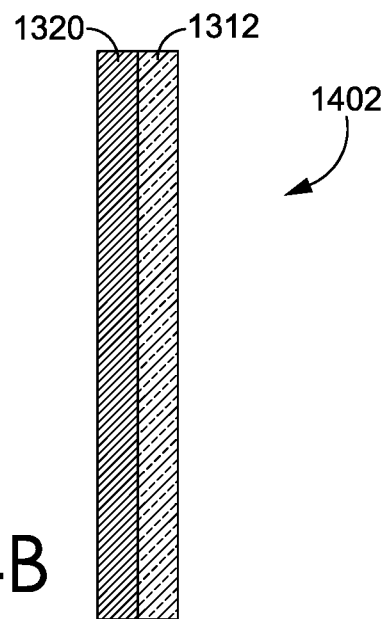
FIG. 14B is a cross-sectional view of the convertible waveguide optical engine assembly shown in FIG. 14A taken at line 14B-14B in accordance with aspects disclosed herein.

FIG. 13A illustrates a different configuration of a waveguide optical engine assembly 1310 is shown, where the waveguide 1312 may be coupled to, for example, a smart glass type of technology to switch the waveguide 1312 between an opaque configuration (as shown in FIG. 14) and a transparent configuration 1300. For example, the waveguide 1312 may be coated or otherwise treated with, for example, an electrochromic layer 1320 shown in the cross-sectional view 1302 of the waveguide 1312 taken through the line 13B-13B in FIG. 13A, that is configured to react to electricity, that is a particular voltage such that when a suitable voltage is provided, the electrochromic layer 1320 coupled to the waveguide 1312 may be in its transparent configuration 1300 or vice versa (i.e., meaning that the electrochromic layer 1320 may be in its transparent state in the absence of electricity/voltage), depending on the type of treatment or coating provided. Similar to the waveguide optical engine assemblies discussed previously herein, the waveguide optical engine assembly 1310 may also be equipped with a projection assembly 1314. Particularly, similar to the waveguide optical engine assembly 1010, the waveguide 1312 and the projection assembly 1314 may be secured to a base 1316 in such a way that an output portion of the projection assembly 1314 and an input portion 1311 of the waveguide 1312 are in alignment with each other so that an image generating from the projection assembly 1314 can be transferred to and projected by the display portion 1318 of the waveguide 1312. FIG. 14A illustrates the waveguide optical engine assembly 1310 when it is in its opaque configuration 1400, and FIG. 14B illustrates a cross-sectional view 1402 of the waveguide 1312 taken through the line 14B-14B in FIG. 14A. As shown, the electrochromic layer 1320 changes from a transparent state to an opaque state. As provided above, depending on the type of technology provided, the transition from transparent to opaque state may be in response to the application of an appropriate stimulus or the absence of such. Although shown as completely opaque in FIGS. 14A and 14B, it is contemplated that there may be different levels of opacity for the waveguide depending on different amounts or levels of stimulus provided, which in the case of the electrochromic layer, may translate into different voltages. In other words, it is contemplated that the waveguide 1312 may have a plurality of intermediate opacity states between the transparent configuration 1300 and the opaque configuration 1400. The waveguide 1312 has been described as comprising an electrochromic treatment, however, it is contemplated that any suitable treatment that would achieve the results discussed herein, are believed to be within the scope of the present disclosure.

Further aspects disclosed herein may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

Figure 15:
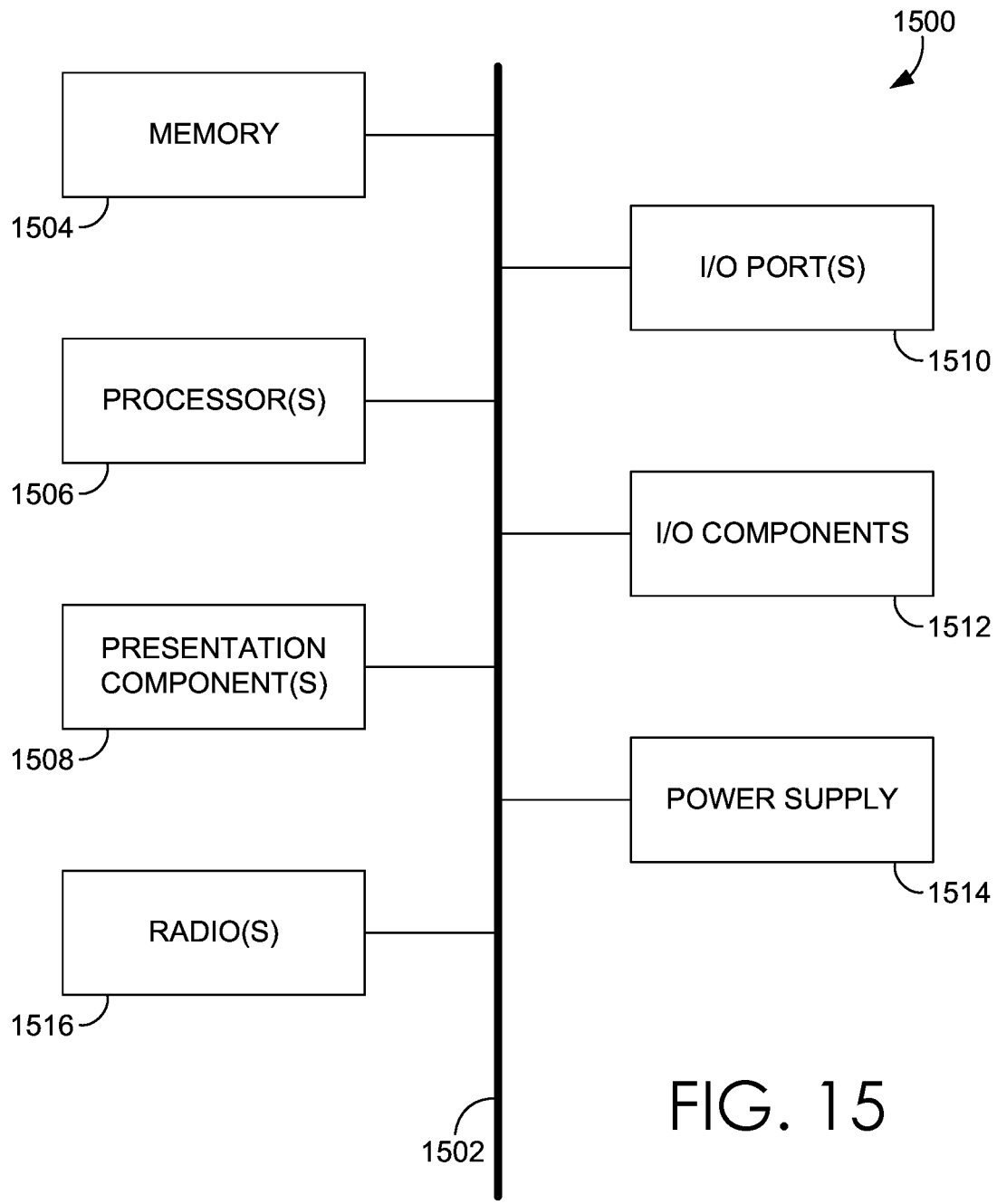
FIG. 15 is a block diagram of an exemplary computing environment suitable for use in implementing aspects disclosed herein.

Referring to FIG. 15, an exemplary operating environment for implementing aspects disclosed herein, is shown and designated generally as computing device 1500. Computing device 1500 is but one example of a suitable computing environment and is not intended to suggest any limitation as to the scope of use or functionality of the invention. Neither should the computing device 1500 be interpreted as having any dependency or requirement relating to any one or combination of components illustrated.

As shown in FIG. 15, computing device 1500 may include a bus 1502 that directly or indirectly couples the following devices: memory 1504, one or more processors 1506, one or more presentation components 1508, input/output (I/O) components 1510, input/output components 1512, and an illustrative power supply 1514. Bus 1502 represents what may be one or more busses (such as an address bus, data bus, or combination thereof). Although the various blocks of FIG. 15 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 15 is merely illustrative of an exemplary computing device that can be used in connection with one or more embodiments of the present invention. Distinction is not made between such categories as "workstation," "server," "laptop," "hand-held device," "portable computing device," and the like, as all are contemplated within the scope of FIG. 15 and reference to "computing device."

Computing device 1500 typically includes a variety of computer-readable media. Computer-readable media can be any available media that can be accessed by, for example, head-mounted computing devices 103, 1030, and the like, that can include both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by, for example, computing device 1500, shown in FIG. 10. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1504 includes computer-storage media in the form of volatile and/or nonvolatile memory. The memory may be removable, non-removable, or a combination thereof. Exemplary hardware devices include solid-state memory, hard drives, optical-disc drives, secure digital (SD) cards, micro SD cards, and the like. Computing device 1500 includes one or more processors that read data from various entities such as memory 1504 or I/O components 1510. Presentation component(s) 1508 present data indications to a user or other device. Exemplary presentation components include a display devices (e.g., the waveguide optical engine assembly 110, 1010, and 1310, as shown in the figures), speakers, printing components, vibrating components, light components, and the like.

I/O components 1510 allow computing device 1500 to be logically coupled to other components of the computing device 1500, some of which may be built in. Illustrative components include a microphone, joystick, game pad, satellite dish, scanner, printer, wireless routers, Bluetooth devices, and the like. The I/O components 1510 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition associated with a display of the head mounted computing devices 130 or 1030, for example. The computing device 1500 may be equipped with depth cameras, such as stereoscopic camera systems, infrared camera systems, RGB camera systems, touchscreen technology, and combinations of these, for gesture detection and recognition. Additionally, the computing device 1500 may be equipped with accelerometers or gyroscopes that enable detection of motion. The output of the accelerometers or gyroscopes may be provided to the display of the computing device 1500 to render immersive augmented reality (AR) or virtual reality (VR).

The head-mounted computing devices in accordance with aspects herein, such as the head-mounted computing device 130, can be set up as or similar to, for example, the computing device 1500 shown in FIG. 15, which can be logically coupled to the waveguide optical engine assembly (e.g., 110, 1010, 1310), a power source (i.e., battery or batteries, not shown), a camera, a microphone, and the like. The head-mounted computing devices and the waveguide optical engine assembly (e.g., 110, 1010, 1310) are configured to display a visual output (e.g., image, video) communicated thereto, or stored therein. The arrangement of the waveguide optical engine assembly 110 provided with the light shield 170, as shown in FIG. 8, allows for reduced footprint by allowing the placement of the different computing components, I/O components, structural components, and/or power source components, immediately behind the waveguide 112, instead of a separate location on the head-mounted computing devices. The footprint of the waveguide optical engine assembly 1010, as shown in FIG. 10, or the waveguide optical engine assembly 1310, shown in FIG. 13A-14B, as well, do not significantly increase the footprint, while additionally providing the ability to take advantage of the properties of the waveguide when it is in its transparent form.

In accordance with further aspects disclosed herein, the head-mounted computing devices can include modules (e.g., hardware and/or software) adapted to adjust features of the waveguide optical engine assembly 110, 1010, or 1310, such as power delivery, brightness, contrast, and the like. While such adjustable features may be typically connected to those of the microprojector 135, or projection assemblies 1014 and 1314, the present disclosure references the waveguides 112, 1012, or 1312 as the affected component for purposes of simplifying the description. In accordance with various embodiments, the at least one processor or modules of the head-mounted computing devices can execute instructions stored in memory to decrease a default brightness and/or power capacity to be delivered to the waveguides 112, 1012, or 1312 to adjust brightness by decreasing an amount of light needed to view a source image through waveguides 112, 1012, or 1312. This is because the waveguide optical engine assemblies 110, 1010, or 1310, respectively, are configured to prevent environmental light from interfering with the visual output of the waveguide 112, obstructed configuration 1208 of the waveguide 1012, or the opaque configuration 1400 of the waveguide 1312 (as environmental light typically would interfere in conventional use cases of a waveguide due to its transparent/translucent nature), as such, the arrangement of components of the waveguide optical engine assemblies 110, 1010, and 1310, respectively, in turn decrease certain power-hungry settings of the waveguides 112, 1012, or 1312 in traditional (i.e., conventional) uses of the waveguide 112, 1012, or 1312, resulting in an extended battery life.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A waveguide optical engine assembly comprising:
   a base;
   a waveguide having an input portion and an electrochromic layer positioned adjacent to a rear surface of the waveguide; and
   a projection assembly configured to project a source image,
   wherein the waveguide and the projection assembly are secured to the base and the source image received by the input portion of the waveguide is displayed in a display surface of the waveguide, the electrochromic layer being configured to switch the waveguide between a transparent configuration and an opaque configuration based on an electrical stimulus.

2. The waveguide optical engine assembly of claim 1, further comprising a brightness controller adapted to reduce a brightness level of the source image.

3. The waveguide optical engine assembly of claim 1, wherein the waveguide optical engine assembly is adapted for coupling to a boom arm of a head-mounted computing device.

4. The waveguide optical engine assembly of claim 3, wherein the display surface is configured to face at least one eye of a wearer when the head-mounted computing device is in an as-worn configuration.

5. The waveguide optical engine assembly of claim 3, wherein the waveguide optical engine assembly is rotatably or pivotably coupled to the boom arm through a connection assembly.

6. The waveguide optical engine assembly of claim 3, wherein the boom arm comprises an articulating joint.

7. The waveguide optical engine assembly of claim 1, wherein the projection assembly is rotatably coupled to the base.

8. The waveguide optical engine assembly of claim 1, wherein the projection assembly comprises a microprojector and a prism assembly.

9. A head-mounted computing device comprising:
   one or more memory devices storing one or more executable instructions;
   one or more processors configured to execute the one or more executable instructions stored in the one or more memory devices;
   a resilient support;
   a power source; and
   a waveguide optical engine assembly comprising:
      a base;
      a waveguide having an input portion and an electrochromic layer positioned adjacent to a rear surface of the waveguide;
      a projection assembly configured to project a source image;
      wherein the waveguide and the projection assembly are secured to the base, and wherein the source image received by the input portion of the waveguide is displayed in a display surface of the waveguide, the electrochromic layer being configured to switch the waveguide between a transparent configuration and an opaque configuration based on an electrical stimulus.

10. The head-mounted computing device of claim 9, wherein the waveguide optical engine assembly is coupled to the resilient support by a boom arm.

11. The head-mounted computing device of claim 10, wherein the boom arm comprises at least one articulating joint.

12. The head-mounted computing device of claim 9, wherein the display surface of the waveguide is configured to face at least one eye of a wearer when the head-mounted computing device is in an as-worn configuration.

13. The head-mounted computing device of claim 9, wherein the projection assembly is rotatably coupled to the base.

14. The head-mounted computing device of claim 9, wherein the waveguide optical engine assembly further comprises a brightness controller.

15. The head-mounted computing device of claim 9, wherein the waveguide optical engine assembly is rotatably or pivotably coupled to a boom arm through a connection assembly.

16. The head-mounted computing device of claim 15, wherein the connection assembly comprises a ball joint.

* * * * *